United States Patent
Morita et al.

(10) Patent No.: US 9,474,204 B2
(45) Date of Patent: Oct. 25, 2016

(54) WORK MACHINE HAVING OPERATION ROD

(71) Applicant: MAKITA CORPORATION, Aichi (JP)

(72) Inventors: Yoshifumi Morita, Aichi (JP); Katsuna Hayashi, Aichi (JP)

(73) Assignee: MAKITA CORPORATION, Aichi (JP)

( * ) Notice: Subject to any disclaimer, the term of this patent is extended or adjusted under 35 U.S.C. 154(b) by 66 days.

(21) Appl. No.: 14/099,019

(22) Filed: Dec. 6, 2013

(65) Prior Publication Data

US 2014/0165412 A1 Jun. 19, 2014

(30) Foreign Application Priority Data

Dec. 19, 2012 (JP) ................................ 2012-276395

(51) Int. Cl.
*A01D 34/00* (2006.01)
*A01D 34/78* (2006.01)
*A01D 34/90* (2006.01)

(52) U.S. Cl.
CPC ............. *A01D 34/006* (2013.01); *A01D 34/78* (2013.01); *A01D 34/90* (2013.01)

(58) Field of Classification Search
CPC ...... A01G 3/053; A01D 34/90; A01D 69/02; A01D 34/6806; A01D 34/78; B25G 3/18; H02J 7/0045; Y10S 30/01; B25F 3/00; B25F 5/02; B26B 19/28; H01R 13/639; H02P 6/16
USPC ........ 30/277.4, 276, 296.1, 166.3, 381, 122, 30/208, 347, 272.1, DIG. 1; 439/680, 678, 439/677, 135, 928, 13, 18, 20, 21, 23, 577; 15/328, 405; 173/217
See application file for complete search history.

(56) References Cited

U.S. PATENT DOCUMENTS

| | | | | |
|---|---|---|---|---|
| 3,959,879 A | * | 6/1976 | Sellers | 30/276 |
| 4,748,355 A | * | 5/1988 | Anderson et al. | 310/71 |
| 5,181,369 A | * | 1/1993 | Everts | A01D 34/78 30/276 |
| 5,544,417 A | * | 8/1996 | Atos et al. | 30/276 |

(Continued)

FOREIGN PATENT DOCUMENTS

| | | |
|---|---|---|
| DE | 3919952 | 12/1990 |
| JP | S49-013249 | 3/1974 |

(Continued)

OTHER PUBLICATIONS

German Office Action, mailed Sep. 1, 2015, by the German Patent and Trade Mark Office for the corresponding German Patent Application No. 102013020192.6 (together with an English language translation thereof).

(Continued)

*Primary Examiner* — Ghassem Alie
(74) *Attorney, Agent, or Firm* — Greenblum & Bernstein, P.L.C.

(57) ABSTRACT

A work machine includes an operation rod, a front unit disposed at a front end of the operation rod and configured to attach a tool, a rear unit disposed at a rear end of the operation rod and configured to attach a battery, a brushless motor disposed in the front unit and configured to drive the tool, a motor controller disposed in the rear unit and electrically coupled with the battery, and a plurality of motor power lines disposed along the operation rod and configured to electrically couple the motor controller with the brushless motor.

15 Claims, 4 Drawing Sheets

(56) References Cited

U.S. PATENT DOCUMENTS

| | | | |
|---|---|---|---|
| 5,969,445 A | 10/1999 | Horiuchi et al. | |
| 6,014,812 A * | 1/2000 | Webster | 30/276 |
| 6,181,032 B1 * | 1/2001 | Marshall et al. | 307/150 |
| 6,260,278 B1 * | 7/2001 | Faher | A01D 34/902 172/41 |
| 6,424,114 B1 | 7/2002 | Komatsu | |
| 8,098,036 B2 * | 1/2012 | Matsunaga et al. | 318/446 |
| 2003/0089511 A1 * | 5/2003 | Tsuneda | B25B 21/00 173/217 |
| 2007/0273350 A1 * | 11/2007 | Yamamoto | H02M 1/08 323/284 |
| 2008/0073988 A1 * | 3/2008 | Kataoka et al. | 310/71 |
| 2010/0283332 A1 * | 11/2010 | Toukairin et al. | 310/50 |
| 2011/0284255 A1 * | 11/2011 | Ookubo et al. | 173/109 |
| 2012/0007533 A1 * | 1/2012 | Ogawa | H02M 7/5387 318/503 |
| 2012/0104983 A1 | 5/2012 | Tanimoto et al. | |
| 2012/0152583 A1 | 6/2012 | Yanagihara et al. | |
| 2014/0225546 A1 * | 8/2014 | Sato | 318/400.26 |
| 2014/0259692 A1 | 9/2014 | Racov et al. | |

FOREIGN PATENT DOCUMENTS

| | | |
|---|---|---|
| JP | H02-000037 | 1/1990 |
| JP | H10-271789 | 10/1998 |
| JP | 3163285 | 5/2001 |
| JP | 2003-169492 | 6/2003 |
| JP | 2009-125056 | 6/2009 |
| JP | 2011-045345 | 3/2011 |
| JP | 2011-078256 | 4/2011 |
| JP | 2012-130980 | 7/2012 |

OTHER PUBLICATIONS

Japanese Office Action, mailed Jun. 7, 2016, by the Japanese Patent Office for the priority Japanese Patent Application No. 2012-276395 (together with an English language translation thereof).

* cited by examiner

WORK MACHINE HAVING OPERATION ROD

CROSS-REFERENCE TO A RELATED APPLICATION

This application claims priority to Japanese Patent Application No. 2012-276395 filed on Dec. 19, 2012, the contents of which are hereby incorporated by reference into the present application.

TECHNICAL FIELD

The present teachings relates to a work machine having an operation rod. Known work machines of this kind include, for example: a cutter (also known as a "brush cutter"), a pole hedge trimmer, a pole saw, or a pole trimmer.

DESCRIPTION OF RELATED ART

Japanese Patent Application Publication No. 2011-45345 (JP2011-45345A) discloses a conventional brush cutter. This brush cutter is provided with an operation rod, a front unit which is disposed at a front end of the operation rod and to which a blade is attached, and a rear unit which is disposed at a rear end of the operation rod and to which a battery is attached. The brush cutter is also provided with a brushless motor which drives the blade, and a motor control which is electrically connected to the brushless motor. The motor controller switches the direction of the current flowing in the coils of the brushless motor, in accordance with the rotational position of the brushless motor.

SUMMARY

In the conventional brush cutter described above, both the brushless motor and the motor controller are disposed in the front unit. With a composition of this kind, the size and weight of the front unit become large, and the brush cutter becomes difficult to handle.

The present teachings addresses the aforementioned problem by disposing the brushless motor in the front unit and disposing the motor controller in the rear unit. By arranging one of the brushless motor or the motor controller in the front unit and arranging the other in the rear unit, the front unit may be designed to reduce its size and weight while avoiding the rear unit from increasing in size and weight.

In one aspect of the present teachings, a work machine may include an operation rod, a front unit disposed at a front end of the operation rod and configured to attach a tool, a rear unit disposed at a rear end of the operation rod and configured to attach a battery, a brushless motor disposed in the front unit and configured to drive the tool, a motor controller disposed in the rear unit and electrically coupled with the battery, and a plurality of motor power lines disposed along the operation rod and configured to electrically couple the motor controller with the brushless motor.

DETAILED DESCRIPTION

Figure 1:
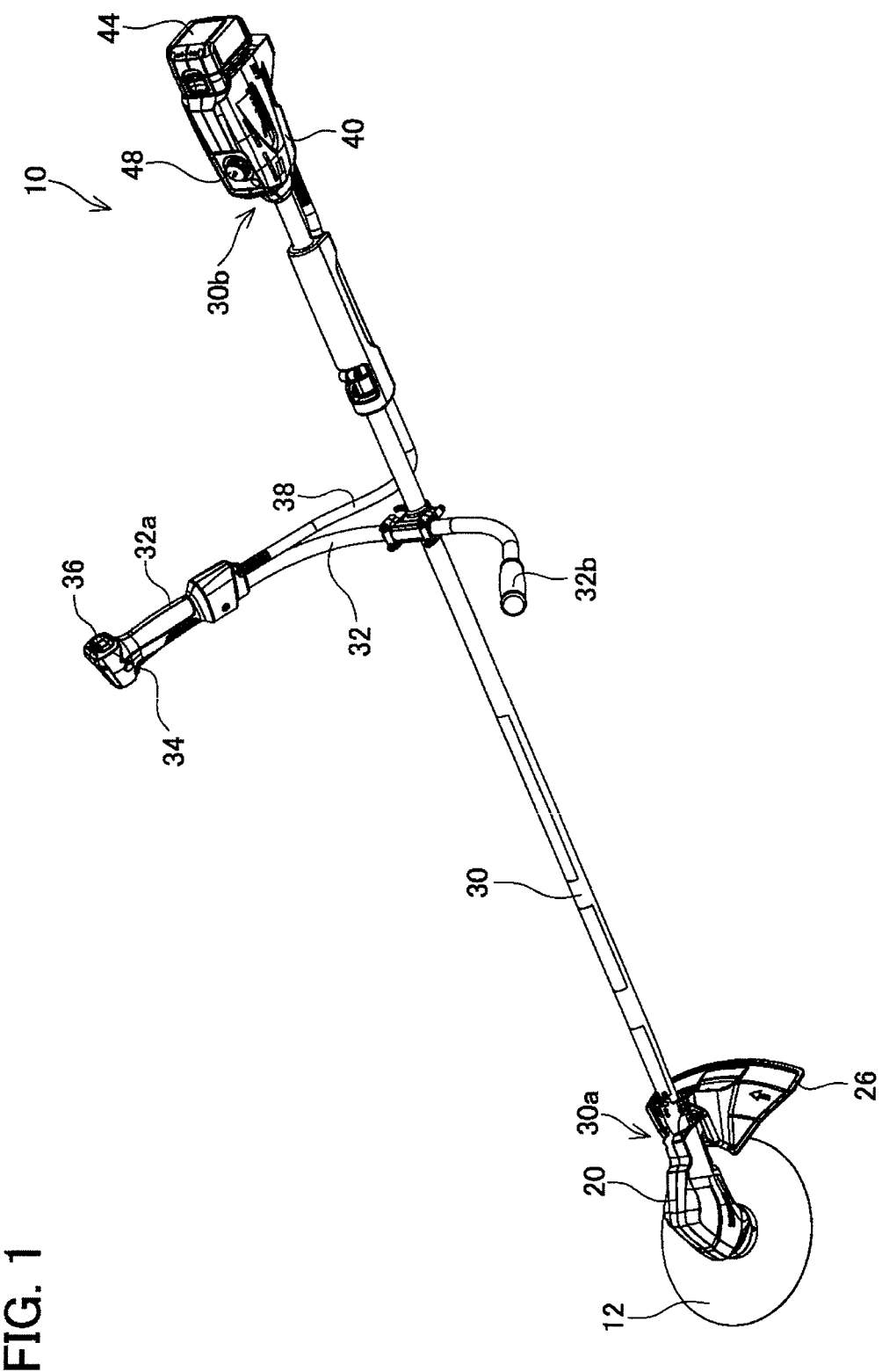
FIG. 1 shows an external view of a brush cutter according to an embodiment 1.

In one embodiment of the present teachings, the motor controller may be preferably configured to switch a direction of electric current flowing in each of the plurality of motor power lines in accordance with a rotational position of the brushless motor.

In one embodiment of present teachings, the motor controller may be preferably configured to connect each of the plurality of motor power lines with either a positive electrode or a negative electrode of the battery in accordance with a rotational position of the brushless motor.

In one embodiment of the present teachings, a motor controller may preferably have a plurality of switching elements and is configured to selectively turn on and off each of the plurality of switching elements in accordance with a rotational position of a brushless motor.

In the above-mentioned embodiment, each of the switching elements may be, but not limited to, a field effect transistor (for example, a MOSFET), an insulated-gate bipolar transistor (for example, an IGBT), or another type of transistor. In this case, each of the transistors may preferably have a lower on-resistance. Accordingly, an amount of heat generated by the transistor is restricted and overheating of a motor controller can be prevented. For example, it has been corroborated that if an on-resistance of the transistor is equal to or smaller than 5 milliohm, then a temperature of the motor controller can be kept at a practicable level.

Additionally to alternatively, the transistor may preferably has a lower gate-resistance. The transistor generates a large amount of heat when in an intermediate state between an on state and an off state. In this respect, if the gate-resistance of the transistor is low, then the transistor can switch from off to on in a short time. Consequently, the amount of heat generated by the transistor is reduced. For example, it has been corroborated that if the gate-resistance of the transistor is equal to or smaller than 1000 milliohm, then the temperature of the motor controller can be kept at a practicable level.

In one embodiment of the present teachings, desirably, a work machine further includes a plurality of sensors disposed in a front unit and configured to output signals in accordance with the rotational position of the brushless motor; and a plurality of signal lines disposed along an operation rod and configured to respectively transmit the signals outputted from the plurality of sensors to the motor controller.

In one embodiment of the present teachings, the work machine having the operation rod may be, but not limited to, one of a cutter (brush cutter), a pole hedge trimmer, a pole saw or a pole trimmer.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved work machines having an operation rod, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

A brush cutter 10 according to an embodiment 1 of the invention is described here with reference to the drawings. FIG. 1 shows an external appearance of a brush cutter 10. The brush cutter 10 is an electrically powered tool used for bush cutting work. As shown in FIG. 1, the brush cutter 10 is provided with an operation rod 30, a front unit 20 which is disposed at a front end 30a of the operation rod 30, and a rear unit 40 which is disposed at a rear end 30b of the operation rod 30. The operation rod 30 is a hollow pipe member which extends in a straight line from the front end 30a to the rear end 30b.

The front unit 20 is composed such that a blade 12 can be attached thereto and detached therefrom. The blade 12 is a tool for a brush cutter 10. The blade 12 in the present embodiment is a circular blade having a plurality of teeth about a perimeter edge, and is made from a metal material. However, the blade 12 is not limited to a composition of this kind, and may be a nylon cord or other cord material, for example. A blade cover 26 is disposed in the vicinity of the front unit 20. The blade cover 26 is fixed to the operation rod 30 and covers a portion of the blade 12.

The rear unit 40 is composed such that a battery pack 44 can be attached thereto and detached therefrom. The battery pack 44 is a power source for the brush cutter 10. The battery pack 44 includes a plurality of rechargeable battery cells. For example, the battery pack 44 according to the present embodiment has ten lithium ion battery cells which are connected together in series, and has a nominal voltage of 36 Volts. A speed dial 48 is provided in the rear unit 40. The speed dial 48 is a manipulation member which is manipulated by the user in order to adjust the speed of rotation of the blade 12. The speed dial 48 is disposed on an upper surface of the rear unit 40, so as to be easily operable by the user. The speed dial 48 is one example of a manipulation member for adjusting the speed, and may also be a manipulation member according to another mode.

A handle 32 to be gripped by the user is provided on the operation rod 30. The handle 32 generally has a U shape and the central portion thereof is fixed to the operation rod 30. A right grip 32a is provided at one end of the handle 32, and a left grip 32b is provided at the other end of the handle 32. Normally, the user is able to use the brush cutter 10 by gripping the right grip 32a with the right hand and gripping the left grip 32b with the left hand. In this case, the front unit 20 is disposed in front of the user and the rear unit 40 is disposed to the rear of the user.

A trigger 34 and a direction selector 36 are provided on the right grip 32a. The trigger 34 and the direction selector 36 are electrically connected to the rear unit 40 by electrical cords 38. The trigger 34 is a manipulation member which is manipulated by the user in order to operate and stop the blade 12. When the user pulls the trigger 34, the blade 12 operates and when the user returns the trigger 34, the blade 12 stops. The trigger 34 is one example of a manipulation member for operating and stopping the blade 12, and it is also possible to use another mode of manipulation member.

The direction selector 36 is a manipulation member which is manipulated by the user in order to switch the direction of rotation of the blade 12. One example of the direction selector 36 is a rocker switch. When the user presses one side of the direction selector 36, the direction of rotation of the blade 12 is set to a forward direction, and when the user presses the other side of the direction selector 36, the direction of rotation of the blade 12 is set to a reverse direction. The direction selector 36 is one example of a manipulation member for switching the direction of rotation of the blade 12, and is not limited to a lock switch, but rather may also be another mode of manipulation member.

Figure 2:
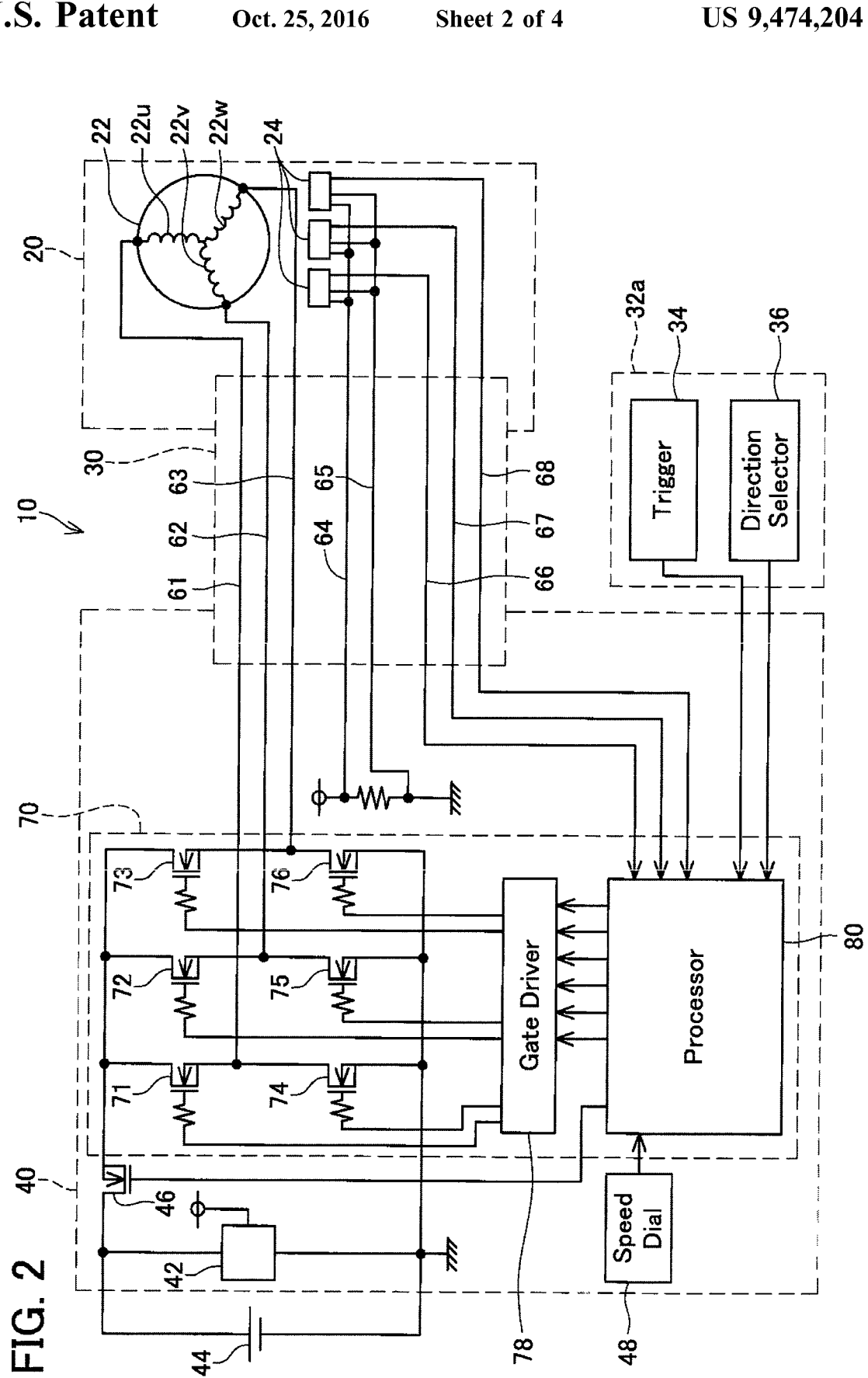
FIG. 2 shows a schematic view of a composition of the brush cutter according to the embodiment 1.

The internal structure of the brush cutter 10 is now described with reference to FIG. 2. As shown in FIG. 2, the brush cutter 10 includes a brushless motor 22 and three sensors 24. The brushless motor 22 and the three sensors 24 are disposed in the front unit 20, and are accommodated inside a housing of the front unit 20. The brushless motor 22 is a prime mover for driving the blade 12, and is connected mechanically to the blade 12. The brushless motor 22 according to the present embodiment is a three-phase brushless motor, having a U-phase coil $22u$, a V-phase coil $22v$ and a W-phase coil $22w$. The three sensors 24 output a prescribed signal in accordance with the rotational position of the brushless motor 22 (and more precisely, the rotational position of the rotor of the brushless motor 22). One example of the sensor 24 according to the present embodiment is a Hall element. The sensor 24 may be another type of sensor that detects another condition index of the brushless motor 22, instead of the rotational position of the brushless motor 22.

The brush cutter 10 includes a motor controller 70 and three motor power lines 61, 62, 63. The motor controller 70 is disposed in the rear unit 40 and is electrically connected to the battery pack 44. The three motor power lines 61, 62, 63 electrically connect the motor controller 70 disposed in the rear unit 40 with the brushless motor 22 disposed in the front unit 20. The first motor power line 61 is connected to the U-phase coil $22u$ (or U-phase terminal) of the brushless motor 22, the second motor power line 62 is connected to the V-phase coil $22v$ (or V-phase terminal) of the brushless motor 22, and the third motor power line 63 is connected to the W-phase coil $22w$ (or the W-phase terminal) of the brushless motor 22.

The three motor power lines 61, 62, 63 are disposed along the operation rod 30 and extend from the rear unit 40 to the front unit 20. In the present embodiment, the three motor power lines 61, 62, 63 are disposed inside the operation rod 30, but these lines may also be disposed outside the operation rod 30. By this composition, the battery pack 44 is electrically connected to the brushless motor 22 via the motor controller 70. In other words, electric power from the battery pack 44 is supplied to the brushless motor 22 via the motor controller 70.

The brush cutter 10 includes two sensor power lines 64, 65 and three sensor signal lines 66, 67, 68. The two sensor power lines 64, 65 are conductive lines which supply operating power to the three sensors 24 from the rear unit 40. The two sensor power lines 64, 65 are disposed along the operation rod 30 and extend from the rear unit 40 to the front unit 20. The three sensor signal lines 66, 67, 68 are conductive lines which send the output signals of the three sensors 24 to the motor controller 70. The sensor signal lines 66, 67, 68 are disposed along the operation rod 30 and extend from the front unit 20 to the rear unit 40. In the present embodiment, two sensor power lines 64, 65 and three sensor signal lines 66, 67, 68 are disposed inside the operation rod 30, but these may also be disposed outside the operation rod 30.

The brush cutter 10 is provided with a voltage regulator circuit 42 and a shutoff circuit 46. The voltage regulator circuit 42 and the shutoff circuit 46 are disposed in the rear unit 40 and are electrically connected to the battery pack 44. The voltage regulator circuit 42 generates a power source voltage which is supplied to the motor controller 70 and the sensor 24. The shutoff circuit 46 is disposed on a circuit which electrically connects the battery pack 44 and the motor controller 70, and is able to electrically connect or cut off the battery pack 44 and the motor controller 70. The shutoff circuit 46 according to the present embodiment is, for example, a field-effect transistor (for example, a MOSFET). The shutoff circuit 46 may be an insulated gate-type bipolar transistor (for example, an IGBT) or another switching element. The shutoff circuit 46 is connected to the motor controller 70 and is controlled by the motor controller 70.

Figure 3:
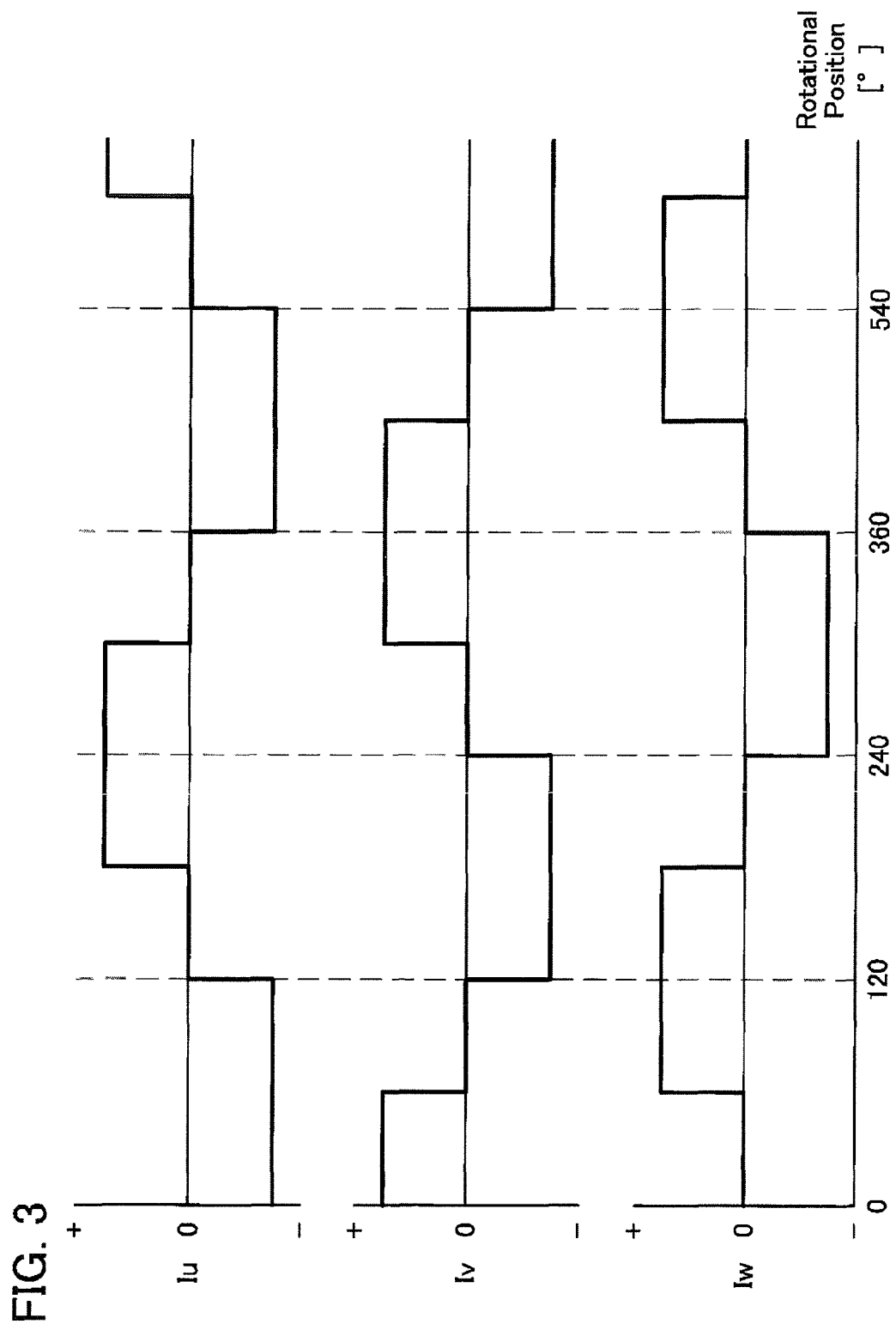
FIG. 3 shows a direction of current flowing in respective coils (motor power lines) of a brushless motor.

The motor controller 70 identifies the rotational position of the brushless motor 22, on the basis of the output signals from the three sensors 24, and switches the direction of the current flowing to the coils $22u$, $22v$, $22w$ of the brushless motor 22, in accordance with the rotational position of the brushless motor 22. FIG. 3 shows an example of the direction of the current flowing to the coils $22u$, $22v$, $22w$ in accordance with the rotational position of the brushless motor 22. In FIG. 3, the chart Iu shows the current flowing to the U-phase coil $22u$, the chart Iv shows the current flowing to the V-phase coil $22v$, and the chart Iw shows the current flowing to the W-phase coil $22w$. Here, the current Iu flowing in the U-phase coil $22u$ is equal to the current flowing in the first motor power line 61, the current Iv flowing in the V-phase coil $22v$ is equal to the current flowing in the second motor power line 62 and the current Iw flowing in the W-phase coil $22w$ is equal to the current flowing in the third motor power line 63. In other words, in the brush cutter 10 according to the present embodiment, the direction of the current flowing in the motor power lines 61, 62, 63 disposed in the operation rod 30 is switched in accordance with the rotational position of the brushless motor 22.

The motor controller 70 is also connected electrically to the trigger 34, the direction selector 36 and the speed dial 48, and in response to the user's manipulation of these, can adjust the current flowing in the respective motor power lines 61, 62, 63 accordingly. In addition, the motor controller 70 controls the operation of the shutoff circuit 46 in accordance with the user's manipulation of the trigger 34. Consequently, when the user pulls the trigger 34, the shutoff circuit 46 conducts electricity, and when the user returns the trigger 34, the shutoff circuit 46 ceases to conduct electricity.

In the brush cutter 10 according to the present embodiment, a brushless motor 22 is employed as the prime mover of the blade 12. The brushless motor 22 requires a motor controller 70 which switches the direction of the current flowing to the coils $22u$, $22v$, $22w$ in accordance with the rotational position of the motor. If both the brushless motor 22 and the motor controller 70 are disposed in the front unit 20 as in a conventional brush cutter, then the size and weight of the front unit become large and the brush cutter becomes difficult to handle. On the other hand, in the brush cutter 10 according to the present embodiment, the brushless motor 22 is disposed in the front unit 20 and the motor controller 70 is disposed in the rear unit 40. If one of the brushless motor 22 and the motor controller 70 is disposed in the front unit 20 and the other thereof is disposed in the rear unit 40, then the size and weight of the front unit 20 can be reduced, while also suppressing increase in the size and weight of the rear unit 40. In other words, the difference between the size and weight of the front unit 20 and the rear unit 40 can be diminished. As a result of this, the brush cutter 10 becomes easier to handle.

Below, a specific composition of a motor controller 70 will be described. However, the motor controller 70 of the brush cutter 10 is not limited to the mode described below, and it is also possible to employ various other commonly known motor controllers. The motor controller 70 according to the present embodiment is provided with six switching elements 71 to 76, a gate driver 78 and a processor 80. The processor 80 is connected electrically to the switching elements 71 to 76, via the gate driver 78.

The processor 80 selectively switches each of the switching elements 71 to 76 in accordance with an output signal from the three sensors 24 in order to selectively connects each of the motor power lines 61, 62, 63 to the positive electrode or the negative electrode of the battery pack 44. For example, if the first switching element 71 is turned on and the second switching element 72 is turned off, then the first motor power line 61 is connected to the positive electrode of the battery pack 44. Simultaneously with this, when the third switching element 73 is turned off and the fourth switching element 74 is turned on, then the second motor power line 62 is connected to a negative electrode of the battery pack 44. In this case, a current flows in the first motor power line 61 towards the front unit 20, and a current flows in the second motor power line 61 towards the rear unit 40. In this way, the processor 80 can switch the direction of the current flowing in the motor power lines 61, 62, 63 (in other words, the direction of the current flowing in the coils $22u$, $22v$, $22w$ of the brushless motor 22) by selectively switching the six switching elements 71 to 76. In addition to this, the processor 80 is able to adjust the operation of the six switching elements 71 to 76 and thereby alter the speed of rotation and direction of rotation of the brushless motor 22, in accordance with the output signals from the trigger 34, the direction selector 36 and the speed dial 48.

The switching elements 71 to 76 are field effect transistors, and more precisely, MOSFETs having an insulating gate. However, the switching elements 71 to 76 may be other transistors including an IGBT, and may be switching elements of another type. However, in order to prevent overheating of the motor controller 70, the switching elements 71 to 76 desirably have low heat generation (heat loss). In respect of this point, if the brushless motor 22 and the motor controller 70 are disposed in the front unit 20, as in a conventional brush cutter, then it is conceivable to carry out forced cooling of the motor controller 70 by using a cooling fan of the brushless motor 22. However, in the brush cutter 10 according to the present embodiment, the brushless motor 22 and the motor controller 70 are disposed in mutually different units 20 and 40. Therefore, it is not possible to carry out forced cooling of the motor controller 70 by using the cooling fan of the brushless motor 22.

Accordingly, in the brush cutter 10 according to the present embodiment, suppressing the amount of generated heat (in other words, the loss) of the switching elements 71 to 76 has an important technical significance. In respect of this point, desirably, the switching elements 71 to 76 employ transistors having an on resistance equal to or smaller than 5 milliohm. If the on resistance is equal to or smaller than 5 milliohm, the amount of heat generated by the switching elements 71 to 76 is sufficiently suppressed, and the temperature of the motor controller 70 can be kept to a practicable level without requiring forced cooling by a cooling air flow, or the like. From a similar perspective, desirably, the switching elements 71 to 76 employ transistors having a gate resistance of no more than 1000 ohms. In this case also, the temperature of the motor controller 70 can be kept to a practicable level without requiring forced cooling by a cooling air flow, or the like. To give an example, in the present embodiment, a field-effect transistor having an on resistance of approximately 3.5 milliohms and a gate resistance of approximately 680 ohms is employed.

Second Embodiment

Figure 4:
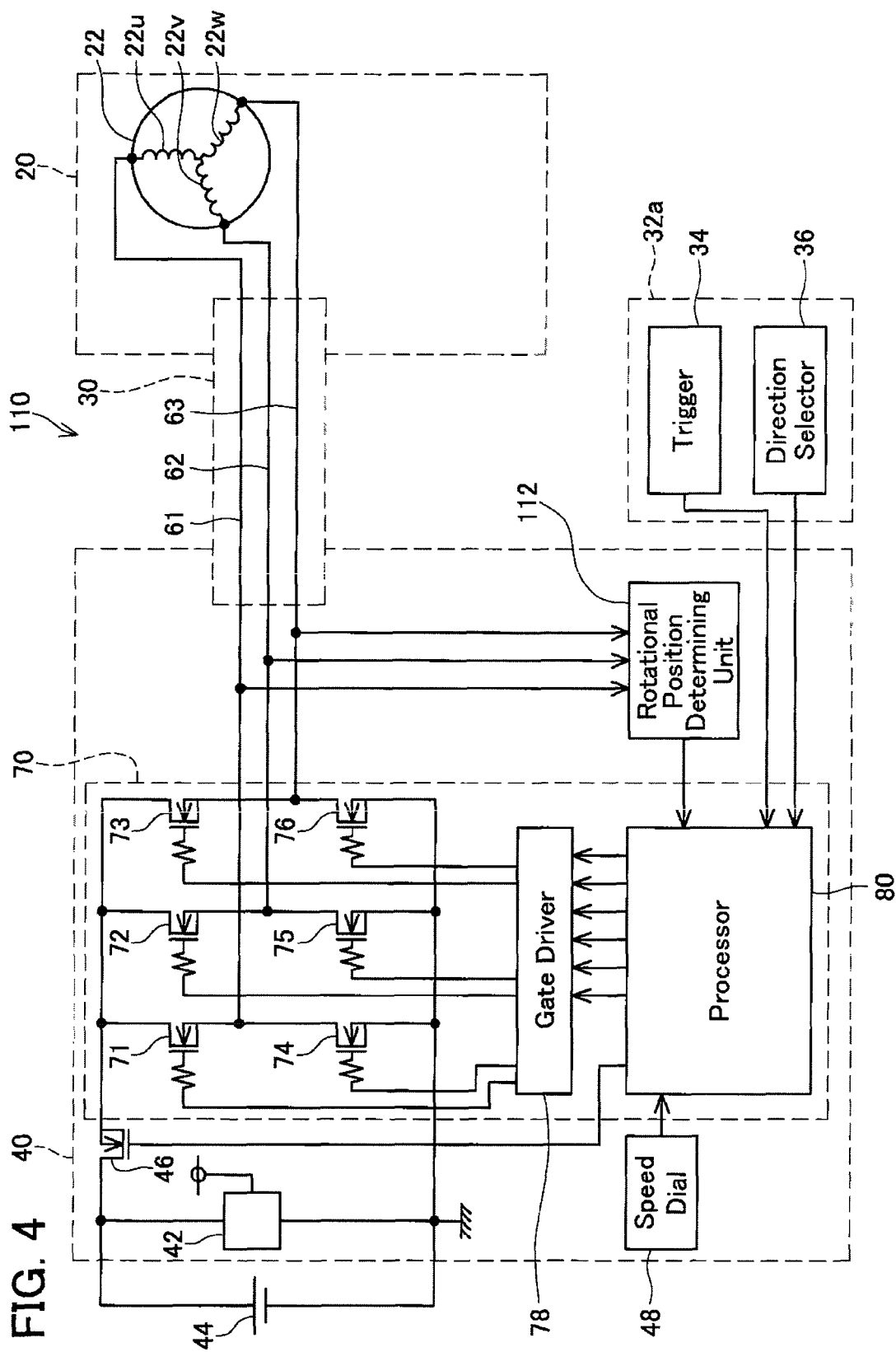
FIG. 4 shows a schematic view of the composition of a brush cutter according to an embodiment 2.

A brush cutter 110 according to a second embodiment of the invention is herein described with reference to the drawings. This description does not cover the composition that is common with the brush cutter 10 of the first embodiment. FIG. 4 shows a schematic view of the composition of a brush cutter 110 according to the second embodiment. In the brush cutter 110 according to the second embodiment, a brushless motor 22 of a sensorless type is employed as a prime mover for driving the blade 12. In addition, the brush cutter 110 according to the second embodiment is provided with a rotational position determining unit 112 in order to detect the rotational position of the brushless motor 22. The rotational position determining unit 112 is electrically connected to the three motor power lines 61, 62, 63. The rotational position determining unit 112 can determine the rotational position of the brushless motor 22 by detecting the counter-electromotive force generated in the coils 22u, 22v, 22w of the brushless motor 22. The determined rotational position is reported to the processor 80 of the motor controller 70.

If a brushless motor 22 of a sensorless type is used, then it is not necessary to provide a sensor 24 (see FIG. 2) for detecting the rotational position of the brushless motor 22, in the front unit 20. Therefore, the electrical composition of the brush cutter 10 is simplified and the number of conductive lines disposed along the operation rod 30 can be reduced.

What is claimed is:

1. A work machine, comprising:
an elongated operation rod;
a front unit disposed at a front end of the elongated operation rod and configured to attach a tool;
a rear unit disposed at a rear end of the elongated operation rod and configured to attach a battery;
a handle provided on a middle portion of the elongated operation rod, the handle being configured to be gripped by a user such that the front unit is disposed in front of the user and the rear unit is disposed behind the user;
a brushless motor disposed in the front unit that is disposed at the front end of the elongated operation rod, and configured to drive the tool;
a motor controller disposed in the rear unit that is disposed at the rear end of the elongated operation rod in order to balance the work machine by reducing the size and weight of the front unit, and electrically coupled with the battery; and
a plurality of motor power lines disposed along the operation rod and configured to electrically couple the motor controller with the brushless motor,
wherein the motor controller includes a plurality of switching elements configured to switch a direction of electric current flowing in each of the plurality of motor power lines, the plurality of switching elements being disposed in the rear unit such that a distance from the plurality of switching elements to the motor is longer than a distance from the plurality of switching elements to the battery.

2. The work machine as in claim 1,
wherein the motor controller is configured to switch the direction of the electric current flowing in each of the plurality of motor power lines in accordance with a rotational position of the brushless motor.

3. The work machine as in claim 2,
wherein the motor controller is configured to connect each of the plurality of motor power lines with either a positive electrode or a negative electrode of the battery in accordance with a rotational position of the brushless motor.

4. The work machine as in claim 3,
wherein the motor controller is configured to selectively switch each of the plurality of switching elements in accordance with the rotational position of the brushless motor.

5. The work machine as in claim 4,
wherein each of the plurality of switching elements is a transistor.

6. The work machine as in claim 5,
wherein each of the transistors has an on-resistance equal to or smaller than 5 milliohm.

7. The work machine as in claim 5,
wherein each of the transistors has a gate-resistance equal to or smaller than 1,000 ohm.

8. The work machine as in claim 1,
wherein the brushless motor comprises a U-phase terminal, V-phase terminal and W-phase terminal, and
the plurality of motor power lines includes a first motor power line connected to the U-phase terminal, a second motor power line connected to the U-phase terminal, and a third motor line connected to the W-phase terminal.

9. The work machine as in claim 1, further comprising:
a plurality of sensors disposed in the front unit and configured to output signals in accordance with a rotational position of the brushless motor; and
a plurality of signal lines disposed along the operation rod and configured to respectively transmit the signals outputted from the plurality of sensors to the motor controller.

10. The work machine as in claim 9,
wherein each of the plurality of sensors is a Hall element.

11. The work machine as in claim 1,
wherein the motor controller is configured to connect each of the plurality of motor power lines with either a positive electrode or a negative electrode of the battery in accordance with a rotational position of the brushless motor.

12. The work machine as in claim 1,
wherein the motor controller comprises a plurality of switching elements and is configured to selectively switch each of the plurality of switching elements in accordance with the rotational position of the brushless motor.

13. The work machine as in claim 1,
wherein the handle includes a controller to operate the tool.

14. The work machine as in claim 13, further comprising:
an electric cord disposed along the elongated operation rod and configured to electrically couple the controller of the handle with the motor controller in the rear unit.

15. The work machine as in claim 14,
wherein the plurality of motor power lines extends inside the elongated operation rod and the electric cord extends outside the elongated operation rod.

* * * * *